May 22, 1951 L. J. WEBER 2,554,435
APPARATUS FOR EFFECTING CONTACT BETWEEN A GAS AND
A DOWNWARDLY FLOWING CONTIGUOUS MASS OF PEBBLES
Filed July 29, 1946
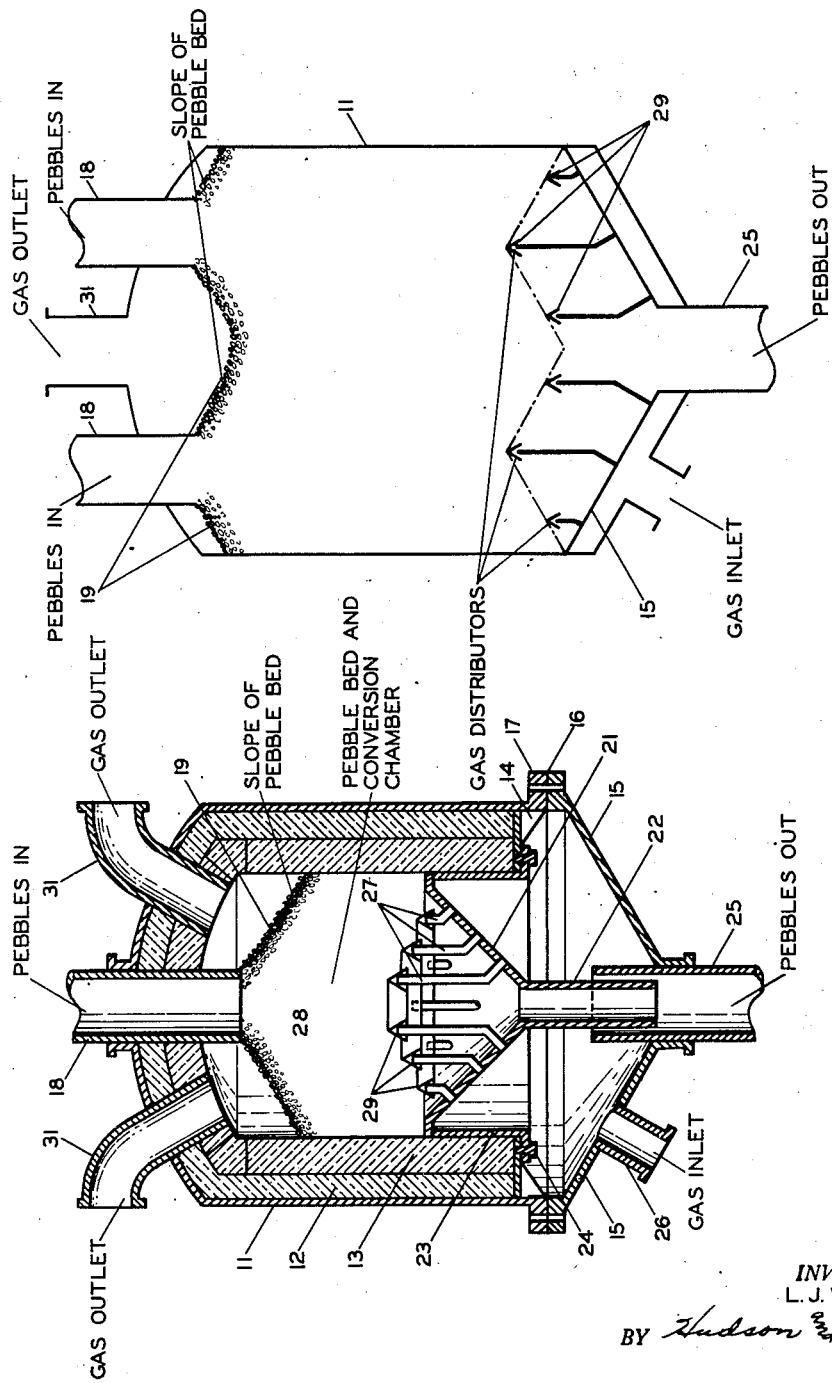
INVENTOR.
L. J. WEBER
BY Hudson & Young
ATTORNEYS Patented May 22, 1951

2,554,435

UNITED STATES PATENT OFFICE 2,554,435

APPARATUS FOR EFFECTING CONTACT BETWEEN A GAS AND A DOWNWARDLY FLOWING CONTIGUOUS MASS OF PEBBLES

Louis Joe Weber, Bartlesville, Okla., assignor to Phillips Petroleum Company, a corporation of Delaware Application July 29, 1946, Serial No. 686,962

5 Claims. (Cl. 23—288)

This invention pertains to a process and apparatus for effecting contact between gases and solid particulate contact material. In one specific embodiment it deals with an improved method of introducing gases to a contacting chamber. Another embodiment of the invention relates to means for adjusting or varying the length of a contact chamber.

The invention is applicable to a variety of processes including hydrocarbon conversion, gas treatment, gas-solid heat exchange, gas adsorption, etc. The solid material used may be catalytic or relatively inert in relation to the gas being contacted. A principal use of the invention is in the conversion of hydrocarbons involving processes such as thermal and catalytic cracking, hydrogenation, dehydrogenation, isomerization, alkylation, reforming, polymerization, desulfurization and oxidation of hydrocarbon fractions.

The contact material may be in the form of a fluent, particulate mass of refractory elements called "pebbles." These pebbles are preferably substantially spherical and relatively uniform in size, but may be rod shaped or irregular in shape or size. Spheres of about ⅛" to 1" in diameter function desirably and those of about ¼" to ½" are most practical. Care must be taken to select pebbles of proper composition for a given process. In cracking at elevated temperatures, e. g., pebbles of a highly refractory character and ruggedness must be utilized. In conducting endothermic reactions at elevated temperatures, it is important to operate with pebbles of relatively high specific heat in order to introduce sufficient heat to the conversion chamber with a minimum flow of pebbles. Pure alumina pebbles fired at temperatures between about 3000° and 3500° F. are suitable for many hydrocarbon conversion processes. Pebbles comprising beryllia, "Carborundum," mullite, periclase, and zirconia make excellent contact materials for some processes. Pebbles of the materials above named may be impregnated with other catalytic materials but this treatment usually renders them less suitable at extremely high temperatures such as 2500° F. and higher. Metal balls such as nickel, Monel, inconel, iron, copper, etc., have utility in specific processes. Various adsorbent materials such as silica gel, various active aluminas, activated carbon, etc., have wide utility in gas treatment and adsorption.

The conventional pebble process with which this invention is most specifically concerned, entails circulating a contiguous mass of pebbles downwardly thru a series of chambers or zones, elevating them to a point above the upper chamber, and again allowing them to descend by gravity thru the several chambers. The bottoms of the treating chambers are usually conical to aid pebble flow out of the chamber thru the relatively narrow neck leading to the succeeding chamber. In hydrocarbon conversion processes pebbles are heated in an upper chamber by contact with a countercurrent stream of hot flue gas after which they pass into the conversion chamber where they heat the hydrocarbons being processed and supply the heat of reaction required. Since countercurrent flow is the usual practice, the lower part of the conversion chamber serves as a feed preheating zone. In operation at extremely high temperatures such as above 2500° F., it is advantageous to allow the pebbles to descend thru a third chamber in which a relatively cool gas, such as air or the gas to be treated, is contacted to reduce pebble temperature to below about 900° F. and permit elevation of the hot pebbles in ordinary carbon steel equipment.

In other gas-solid contact processes certain modifications must be made, such as reconditioning or regenerating the contact pebbles, oxidizing, reducing, desulfuring, etc., in the upper zone.

In numerous gas-solid contact processes it is highly desirable and productive of improved results to maintain a substantially uniform contact time between the gas and the contact pebbles thruout the whole contact chamber. In conventional operation, pebbles enter the upper part of the treating chamber thru an axially positioned conduit extending into the chamber a short but substantial distance, thereby providing for a gas collection space above the pebble mass. The pebble mass takes a natural angle of repose and forms an upright cone as its top surface. The bottom surface of the pebble mass or bed takes the shape of the chamber and is therefore an inverted cone. Since gas is conventionally introduced into the chamber thru openings in the vessel bottom, gas flow upwards thru the bed takes a longer path therethru near the center of the chamber than it does near the periphery. Obviously, this results in unequal contact time thruout the chamber and frequently reduces efficiency. This is particularly true when cracking hydrocarbons to produce a specific product, e. g., in cracking propane rich gases to produce ethylene, too long a contact time results in over cracking and undue carbon deposition as well as undesirable side reactions. Uniform contact time is highly desirable thruout the bed as can be seen from even a cursory consideration of the process factors involved.

In operating pebble-type apparatus it is frequently desirable to change the depth of the pebble bed in order to process different gases in the same apparatus. This can be done by extending the pebble inlet conduit farther into the contact chamber but this is undesirable in various processes because it creates too great a void space above the pebble bed and increases residence time in the reactor. When cracking propane rich gases to produce ethylene undue retention of the gases in the cracking chamber causes undesirable olefin polymerization and decreases yield material.

It is an object of this invention to provide an apparatus for contacting gases and solids in countercurrent moving stream relation which permits substantially uniform contact time thruout the bed of solids.

It is also an object of the present invention to provide a gas-solid contact chamber which can be readily adjusted in length without creating excessive or undue void space above the bed of solids.

A further object of the invention is to provide a method of contacting a downwardly flowing contiguous mass of pebbles with a countercurrent stream of gas which allows substantially uniform contact time between the gas and pebbles thruout the mass.

Another object of the invention is to provide apparatus for contacting gases and pebbles which assures substantially even distribution of gases thruout the mass of pebbles.

Other objects of the invention will become apparent from the accompanying disclosure.

In accordance with the invention a contact chamber is provided which utilizes a false bottom floating on a readily removable sleeve that may be replaced by other longer or shorter sleeves in order to vary the level of the false bottom of the contact chamber. By this arrangement the depth of the pebble bed in the contact chamber may be conveniently varied to suit a given process without changing the void space volume above the pebbles.

In another embodiment of the invention a gas distributing means is provided in the bottom of the contact chamber which admits gas at a plurality of points which are equidistant from the corresponding points of the pebble bed directly above. Where pebbles are admitted thru an axially positioned conduit, the top surface of the pebble bed is substantially conical with the apex of the cone inside of the inlet conduit and the gas inlets are positioned in a conical surface parallel to the upper surface of the pebble bed. This arrangement provides relatively uniform flow of gas thru the bed and equal contact time for all portions of the feed gas in its passage thru the pebble stream.

To understand more fully the exact nature of the invention reference may be had to the drawing of which Fig. 1 is an elevation in section of a preferred arrangement of apparatus.

Fig. 2 is a diagrammatic showing of another embodiment of the invention providing for multiple pebble inlets.

Referring to Fig. 1, 11 is the upper shell of a vertical contact chamber or reactor which is lined with refractory insulating material 12 and high temperature refractory material 13. These refractories are supported on a shelf 14 welded or fixed to shell 11. Lower shell 15 of the reactor is separable from upper shell 11 at 16, the two halves being bolted together thru lugs 17. Pebbles are introduced to the chamber thru conduit 18 and form a bed with a conical surface 19. False bottom 21 in the form of a cone supports the pebble bed and permits pebbles to flow out its apex which is in communication with conduit 22 to which the conical bottom is fixed. Sleeve 23 supports conical bottom 21 and is removably attached to shelf 14 by bolts 24 or similar means. Conduit 22 is in slidable relation with and extends into pebble outlet conduit 25 in order to allow for adjustment of the level of false bottom 21 to obtain the desired depth of pebble bed in the contact zone. Gas inlet 26 admits feed gas thru the lower shell 15 which then passes thru tubes 27 into contact zone 28. Tubes 27 extend thru the conical bottom and discharge into inverted trough-like rings 28. Tubes 27 are arranged in sets to feed into a given ring. Rings 29 are positioned at different levels in order that gas flow from each ring to the pebble bed top surface directly above is the same distance in each case. By this arrangement, a line tangent to the top of the rings is substantially parallel to the pebble bed surface above, thereby providing for substantially equal contact time with the pebble bed for all portions of the gas feed passed thru the chamber. Conduits 31 are gas outlets which carry away the conversion products or treated gases.

Sleeve 23 is easily replaceable with either a longer or shorter sleeve by merely removing lower shell 15 and unbolting the sleeve. The gas distributing means may comprise any number of rings and need not be limited to the shape shown in the drawing. These inverted trough-like rings may be V-shaped, U-shaped, or any channel shape which will distribute gas horizontally in the contact chamber before permitting it to rise thru the pebble bed. It is also feasible to omit the distributing rings and utilize a larger number of smaller tubes having conical caps to prevent plugging by pebbles. Of course, the number of tubes leading to the ring distributors may be varied over a wide range. When desired, a single tube may be positioned in the center of the conical bottom to form the apex of the cone-shaped gas distributing system.

The invention is not limited to cylindrical vessels but may function in rectangular contact chambers or curilinear types other than cylindrical. With other shaped vessels, the false bottom merely need be hopper shaped to aid in permitting desirable pebble flow thru the contact chamber and the rings can be shaped to conform to the vessel shape.

The invention is not limited to a conical shaped distributing means. When utilizing a plurality of pebble inlet conduits the upper surface of the pebble bed will take a shape other than a cone, such as a plurality of cones forming a series of hills and valleys. Likewise, where a single pebble inlet is positioned away from the axis of the vessel and relatively close to one side, the upper surface of the pebble bed and will be an oblique cone with a high side at the vessel wall near the inlet and a low side near the opposite wall. In any case the gas distribution means should conform in general contour to the contour of the pebble bed upper surface in order to provide for substantially uniform gas-solid contact time thruout the contact bed.

Fig. 2 is a diagrammatic illustration of a modification of the invention utilizing a pair of pebble inlets 18 and an axially positioned gas outlet 31 and presenting a double conical pebble bed contour. Gas distributing rings 29 are positioned at levels which conform to the contour of the upper surface of the pebble bed and provide for relatively uniform feed gas flow distance thru the pebble bed. This embodiment illustrates the utility of the novel gas distributing means in a fixed-bottom contact chamber. Obviously, the adjustable false bottom feature of Fig. 1 functions advantageously without the novel gas distributing means and vice versa. The tubes and gas distributing rings shown in Fig. 1 may be omitted and the tube holes in the false bottom will admit feed gas to the contact chamber, but of course, without the advantage of equal contact time for all portions of the feed.

In actual construction conduit 22 makes a relatively close fitting juncture with outlet conduit 25 in order to minimize gas leakage between the two members.

In operations involving the cracking of hydrocarbons, e. g., pebbles are heated by contact with hot combustion gas in a contact chamber similar to that shown in Fig. 1. The hot pebbles are then continuously passed thru conduit 18 into cracking zone 28 where they are intimately contacted with the desired stream of hydrocarbons admitted thru conduit 26 and gas distributing means 27 and 29. As the pebbles pass thru cracking zone 28, they give up heat to the gas to supply heat of reaction in the upper portion of the chamber and to raise the gas to the required cracking temperature in the lower portion of the reaction chamber. The cooled pebbles continuously pass out thru conduit 22 into conduit 25 and are conveyed by a chute into an elevator (not shown) for elevation to a point above the point of inlet to the pebble heating chamber for descent thru the apparatus again.

While the above operation is typical, the invention is not limited to hydrocarbon cracking but on the contrary is applicable to practically all gas-solid phase contacting operations where uniform contacting time is particularly desired and/or where it is advantageous to change the depth of the pebble bed from time to time.

Various modifications of the invention will become apparent to those skilled in the art. The illustrative details disclosed are not to be construed as imposing unnecessary limitations on the invention.

I claim:

1. Apparatus for effecting contact between a gas and a downwardly flowing contiguous mass of pebbles comprising a substantially vertical vessel closed on either end and enclosing a contacting chamber, inlet means for introducing pebbles into the top thereof and outlet means for removing pebbles from the bottom thereof; a false bottom in said vessel slidably adjustable vertically to regulate the length of the contacting chamber; a movable conduit secured to said false bottom and in communication with said contacting chamber thru said false bottom, said movable conduit being slidably mounted in said outlet means and communicating therewith for discharging pebbles from said contacting chamber; means for supporting said false bottom; inlet means in the lower portion of said vessel below said false bottom for admitting a gas; a plurality of holes in said false bottom for passing said gas to said contacting chamber; a gas distributing system in the lower portion of said contacting chamber comprising a plurality of concentric, horizontally disposed, inverted trough-like rings in stair-step arrangement from outermost to innermost so as to present an upper contour conforming generally to the slope of a bed of pebbles admitted to the chamber, a plurality of conduits extending from the holes in said false bottom to said rings so as to conduct gas from below said false bottom to said rings into said contacting chamber; and means in the upper portion of said vessel for withdrawing gas.

2. Apparatus for effecting contact between a gas and a downwardly flowing mass of pebbles comprising a substantially vertical vessel closed on either end, having an axial outlet in the lower end for withdrawing pebbles and having an axial inlet conduit in the upper end extending a substantial but relatively short distance into the interior space of said vessel providing for flow of pebbles thereinto and a gas space thereabove; a false bottom in the form of a hopper slidably adjustable vertically to define a contacting chamber of variable height in the upper end of said vessel; detachably fixed, exchangeable supporting means for said false bottom; outlet means in the bottom of said hopper and a conduit fixed thereto and in communication therewith, said conduit extending into the outlet of said vessel and in slidable relation therewith; a plurality of openings in the walls of said hopper for admitting a gas to said contacting chamber; a gas distributing system in the lower portion of said contacting chamber comprising a plurality of concentric, horizontally disposed, inverted trough-like rings in stair-step arrangement from outermost to innermost so as to present an upper contour conforming generally to the slope of a bed of pebbles admitted to the chamber, a plurality of conduits extending from the holes in said hopper bottom to said rings so as to support the rings and conduct gas from below said hopper bottom to said rings into said contacting chamber; gas inlet means in said vessel below said false bottom; and gas outlet means in said vessel in communication with said gas space.

3. Apparatus for effecting contact between a gas and a downwardly flowing contiguous mass of pebbles which comprises a vertical cylindrical vessel closed on either end and having a conical bottom terminating in a pebble outlet conduit; a conical false bottom spaced apart from the bottom of said vessel and supported at its periphery on an exchangeable ring detachably fixed to the wall of said chamber, said false bottom terminating in a conduit slidably extending into said pebble outlet; conduit means extending into the upper portion of said vessel a short distance for introducing pebbles thereto so as to provide a gas-collecting space above a mass of pebbles therein when filled through said conduit means; gas outlet means in said vessel in communication with said gas-collecting space; a plurality of gas inlets in said false bottom; distributing means for said gas comprising a plurality of upright tubes in communication at their lower ends with said gas inlets and extending upwardly in the lower section of said vessel to progressively higher levels toward the axis of the chamber so as to distribute gas in a generally conical pattern; and gas inlet means in the lower section of said vessel below said false bottom.

4. Apparatus for effecting contact between a gas and a downwardly flowing contiguous mass of pebbles which comprises a vertical cylindrical vessel closed on either end and having a conical bottom terminating in a pebble outlet; conduit means extending into the upper portion of said vessel a short distance for introducing pebbles thereto whereby a gas-collecting space is formed above a mass of pebbles introduced through said conduit means; gas outlet means in said vessel in communication with said gas-collecting space; a plurality of gas inlets in said conical bottom; distributing means for said gas comprising a plurality of tubes in communication at their lower ends with said gas inlets and extending upwardly to a plurality of horizontal axially positioned rings in the form of inverted troughs spaced at different levels in the lower portion of said vessel in stairstep arrangement from the outermost to innermost so as to present an upper contour conforming generally to the slope of a bed of pebbles admitted to the chamber; said plurality of tubes extending from said gas inlets to said rings so as to support the rings and conduct gas to said rings for distribution into said chamber.

5. Apparatus for effecting conversion of gaseous material at elevated temperatures in the presence of a gravitating contiguous mass of pebbles, comprising a vertical cylindrical refractory lined vessel closed on either end and having a conical bottom terminating in a pebble outlet conduit; a conical false bottom spaced apart from the bottom of said vessel and supported at its periphery on an exchangeable ring or sleeve detachably fixed to the wall of said chamber, said false bottom terminating in a conduit slidably extending into said pebble outlet conduit; pebble inlet means comprising at least one conduit extending into the upper section of said vessel a short distance so as to provide a gas-collecting space above a mass of pebbles admitted through said pebble inlet means; gas outlet means in said vessel in communication with said gas-collecting space; a plurality of gas inlets in said false bottom; distributing means communicating with said gas inlets for distributing gas uniformly over a horizontal cross-section of the chamber; and gas inlet means in the lower section of said chamber below said false bottom.

LOUIS JOE WEBER.

REFERENCES CITED

The following references are of record in the file of this patent:

UNITED STATES PATENTS

| Number | Name | Date |
|---|---|---|
| 2,385,189 | Bowles | Sept. 18, 1945 |
| 2,429,359 | Kassel | Oct. 21, 1947 |

FOREIGN PATENTS

| Number | Country | Date |
|---|---|---|
| 4,514 | Germany | Apr. 3, 1879 |
| 29,835 of 1912 | Great Britain | Nov. 6, 1913 |